United States Patent [19]
Sasaki

[11] Patent Number: 4,683,566
[45] Date of Patent: Jul. 28, 1987

[54] DIGITAL RADIO COMMUNICATION SYSTEM

[75] Inventor: Susumu Sasaki, Fujisawa, Japan

[73] Assignee: Fujitsu Limited, Kawasaki, Japan

[21] Appl. No.: 793,242

[22] Filed: Oct. 31, 1985

[30] Foreign Application Priority Data

Nov. 2, 1984 [JP] Japan ................... 59-232081

[51] Int. Cl.⁴ .......................... H04J 3/06; H04L 7/00
[52] U.S. Cl. .................................. 370/100; 375/107; 375/111
[58] Field of Search ............... 370/100, 104, 108, 103, 370/95; 375/111, 118, 107, 108; 455/54–56

[56] References Cited

U.S. PATENT DOCUMENTS

| | | | |
|---|---|---|---|
| 3,982,075 | 9/1976 | Jefferis | 375/107 |
| 4,038,494 | 7/1977 | Miller et al. | 375/111 |
| 4,301,539 | 11/1981 | Kage . | |
| 4,477,895 | 10/1984 | Casper et al. . | |
| 4,494,211 | 1/1985 | Schwartz | 375/107 |

OTHER PUBLICATIONS

Sasaki et al., "Multi-Direction Time Division Multiplex Radio Equipment", pp. 365 to 369, IEEE, 1983.

Primary Examiner—Douglas W. Olms
Assistant Examiner—Curtis Kuntz
Attorney, Agent, or Firm—Staas & Halsey

[57] ABSTRACT

A digital radio communication system in the form of a multi-direction time division multiplex network including a central station having one working transmitter and receiver and one standby transmitter and receiver. Both the working and standby transmitters and receivers have a radio line terminating equipment, and each transmitter and receiver have a first phase shifting circuit for adjusting a phase of a transmission signal and a second phase shifting circuit for adjusting a phase of a sampling clock signal. A signal propagation delay time of the working transmitter and receiver is adjusted by the first phase shifting circuit to become equal to that of the standby transmitter and receiver, then, the phase of a sampling clock signal is adjusted between both second phase shifting circuits to be at a central position of bit width of a reception signal, and a plurality of substations are included, each operatively connected to the central station by time-divided digital radio signal, and each at least having a clock phase shifting circuit for adjusting a phase of a transmission signal transmitted from itself.

3 Claims, 14 Drawing Figures

CENTRAL STATION

SUBSTATION 1

SUBSTATION 2

SUBSTATION n

4,683,566

DIGITAL RADIO COMMUNICATION SYSTEM

BACKGROUND OF THE INVENTION

1. Field of the Invention

The present invention relates to a digital radio communication system in the form of a multi-points to single point time division multiplex network.

The present invention is advantageously used for a high speed and high frequency band digital subscriber radio communication system, for instance, a so-called local area network (LAN).

2. Description of the Related Art

Recently, demands for a high speed and high density communication system have greatly increased in large scale office automation. As one known example for satisfying these demands, there is a high frequency band (for example, 26 GHz) digital subscriber radio system for the LAN.

This system comprises a central station and a plurality of substations (i.e., subscribers). The multi-points to single point time division multiplex network is comprised of these stations. A central station is used in common by these substations and each substation is arbitrarily added to the network. The central station, in general, comprises one working and one standby transmitter and receiver unit. The standby transmitter and receiver unit is designed to deal with a failure of the working transmitter and receiver unit, and has the same structure as that of the working transmitter and receiver.

In the central station, however, problems arise regarding high speed digital signal propagation. That are, when the working transmitter and receiver is changed to the standby transmitter and receiver, a phase in a sampling clock signal and a difference in signal propagation delay time for the transmission signal occur between the working and the standby units. This phase lag and delay time are caused by, first, differences in length of the connection cables between the working and the standby units, and, second, differences in electrical characteristics between the working and the standby units. As a result, signal propagation delay time of the transmission signal occurs between the central station and each substation.

Although the phases of the sampling clock signal and the propagation delay time are adjusted between the working transmitter amd receiver unit and the standby transmitter and receiver unit, it is troublesome to perform the work needed to make the adjustment of the phase and delay time since the transmitter and receiver are usually located at the top of a radio tower, and conversely, radio line terminating equipment is located at the bottom of the radio tower.

SUMMARY OF THE INVENTION

An object of the present invention is to provide a digital radio communication system in the form of a multi-points to single point time division multiplex network enabling elimination of phase lags and leads of the sampling clock signal and the signal propagation delay time when changing operation from the working transmitter and receiver to the standby transmitter and receiver.

In accordance with the present invention, there is provided a digital radio communication system in the form of a multi-points to point time division multiplex network including a central station having one working and one standby transmitter and receiver unit where both the working and standby transmitter and receiver units have radio line terminating equipment. Each transmitter and receiver unit also has a first phase shifting circuit for adjusting the phase of a transmission signal and a second phase shifting circuit for adjusting the phase of a sampling clock signal. A signal propagation delay time of the working transmitter and receiver is previously adjusted by the first phase shifting circuit so as to become equal to that of the standby transmitter and receiver. The then, phase of a sampling clock signal is also previously adjusted between both second phase shifting circuits so as to be at a central position of the bit width of a reception signal. A plurality of substations are included, each operatively connected to the central station by a time-divided digital radio signal, and each at least having a clock phase shifting circuit for adjusting the phase of a transmission signal transmitted from itself.

DESCRIPTION OF THE PREFERRED EMBODIMENTS

Before describing the preferred embodiments of the present invention, an explanation will be given of a conventional digital radio communication system in the form of a multi-points to single point time division multiplex network.

Figure 1:
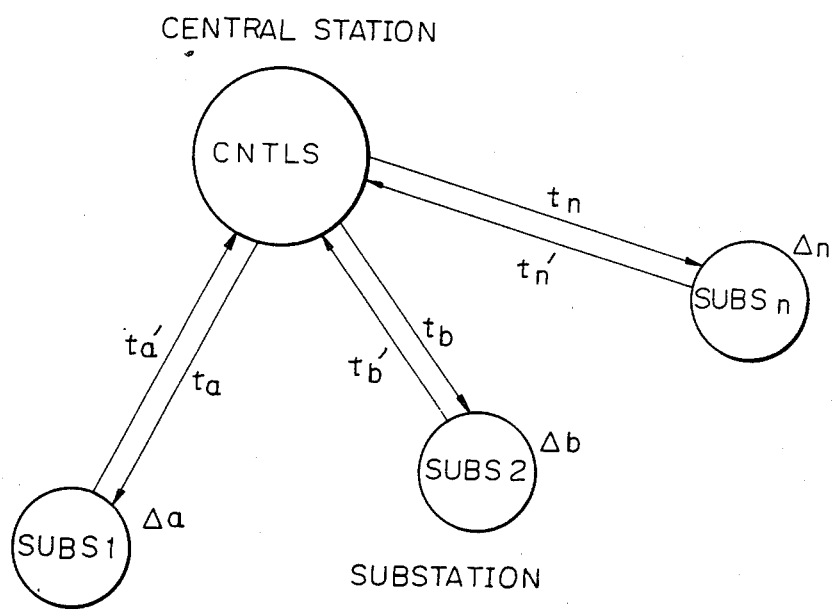
FIG. 1 illustrates a general system structure of a conventional multi-points to point time division multiplex network for digital radio communications.

Referring to FIG. 1, as mentioned above, the network includes a central station CNTLS and two or more substations $SUBS_1$ to $SUBS_n$. The central station simultaneously transmits continuous time-divided signals to all substations as explained below. Each substation extracts frame signals produced by the central station from the received signals, as explained below.

Figure 2A:
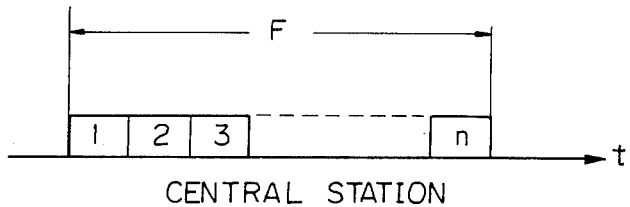
FIGS. 2A to 2D are frame formats of the transmission and reception signals between a central station and each substation.
Figure 2B:
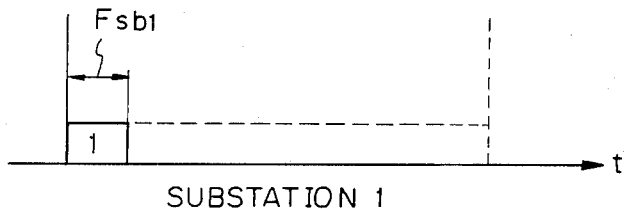
Figure 2C:
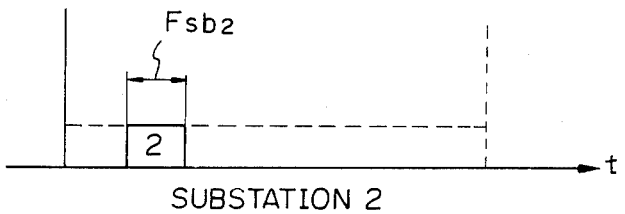
Figure 2D:
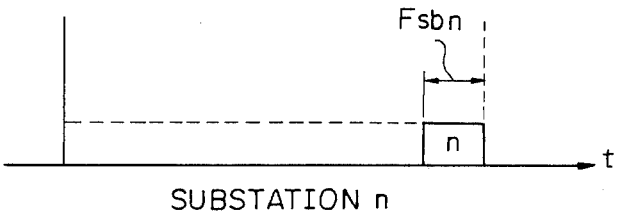

FIGS. 2A to 2D are frame formats of the transmission and reception signals between the central station and each substation. FIG. 2A shows a transmission signal from the central station. This signal is formed as a time-divided series multiplex PCM signal having a frame length F on the time axis t. This signal is simultaneously transmitted to all substations. FIGS. 2B to 2D show received signals at each substation. That is, each of substations $SUBS_1$ to $SUBS_n$ receives the signal in the time band allocated to itself, i.e., receives the signal during a subframe length $F_{sb1}, F_{sh2}, \ldots, F_{sbn}$, respectively, in the frame F.

Figure 3A:
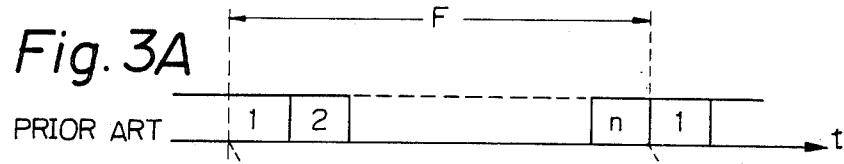
FIGS. 3A to 3D are timing charts of a conventional transmission frame and reception frame.
Figure 3B:
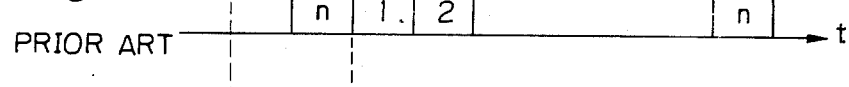
Figure 3C:
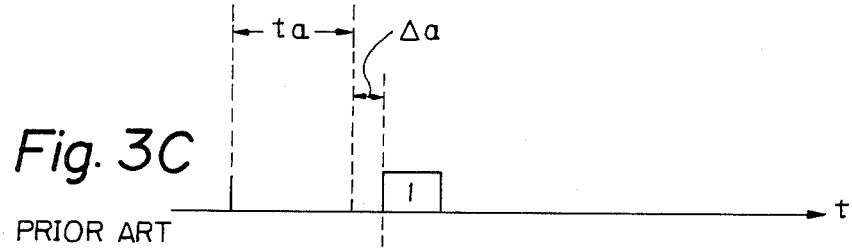
Figure 3D:

FIGS. 3A to 3D show the relationship between the transmission signal and the reception signal. FIG. 3A shows the time-divided transmission signal from the central station, which signal is similar to that of FIG. 2A. FIG. 3B shows the reception of signals at each substation after a propagation delay time ta. FIG. 3C shows a transmission signal from the substation $SUBS_1$ after a time delay $\Delta a$ caused by a phase lag and transmission bit lag. FIG. 3D shows the reception of a signal by the central station after a propagation delay time ta'. As is obvious from FIG. 3D, each transmission signal from each substation is sequentially received by the central station.

Each substation transmits the signal within the time band allocated to itself by synchronizing the sampling clock signal which is contained in the transmission signal from the central station. In this case, the signal propagation delay time ta and ta' between the central station and each substation is adjusted by a conventional delay adjuster (not shown) in each substation.

Figure 4:
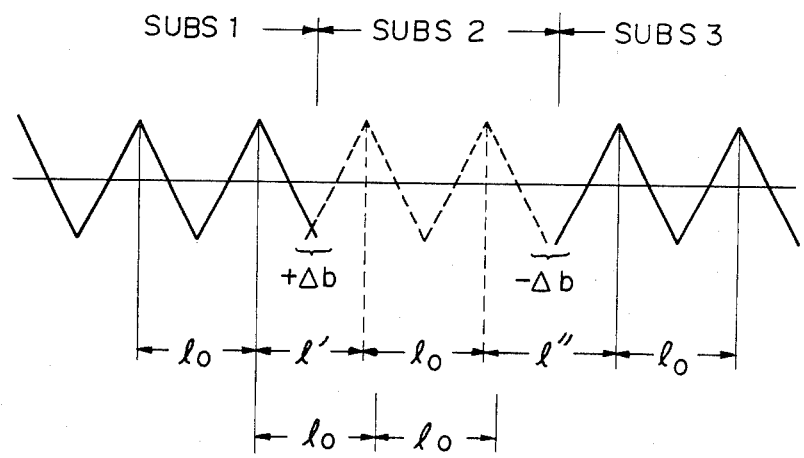
FIG. 4 is a timing chart of a reception signal at a conventional central station.

FIG. 4 is a timing chart for the reception of a signal at the central station. In FIG. 4, the solid line represents the correct phase and the dotted line represents an incorrect phase (advanced phase) of the reception of the signal at the central station during. That is, during the period "$l_0$" the phase is correct and the periods "$l'$, $l'''$" is incorrect. Accordingly, the period "$l''$" is shorter than "$l_0$" and the period "$l'''$" is longer than "$l_0$".

Figure 5:
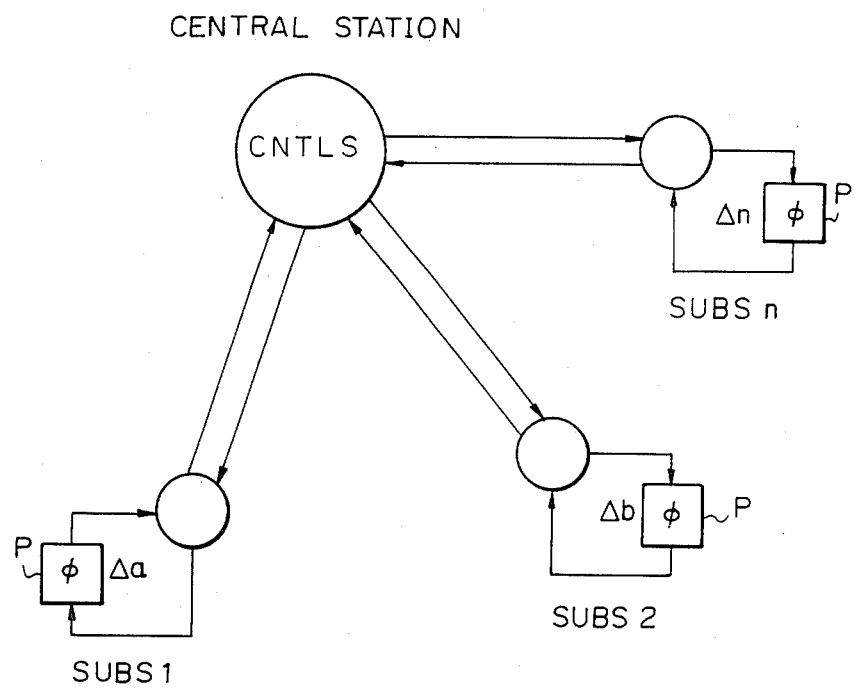
FIG. 5 is a schematic structure of each substation according to the present invention.

FIG. 5 is a schematic structure of each substation accorrding to the present invention. Each substation comprises a clock phase shifter P for adjusting the phase lag. The clock phase shifter P adjusts the incorrect phase shown in FIG. 4 to the correct phase. Reference letters $\Delta a$, $\Delta b$, ..., $\Delta n$ represent the value of the fine adjustment of the phase provided by clock phase shifter P.

In the present invention, the same frame formats of the transmission and reception signals as shown in FIGS. 2A to 2D and 3A to 3D are also used as the timedivided signal. Accordingly, as mentioned above, the central station CNTLS simultaneously transmits continuous signals to all substations in the form of the timedivided signals. Each substation $SUBS_1$ to $SUBS_n$ extracts frame signals produced by the central station from the received signals. Based on these signals, it selects only the signals allocated to itself.

Figure 6:
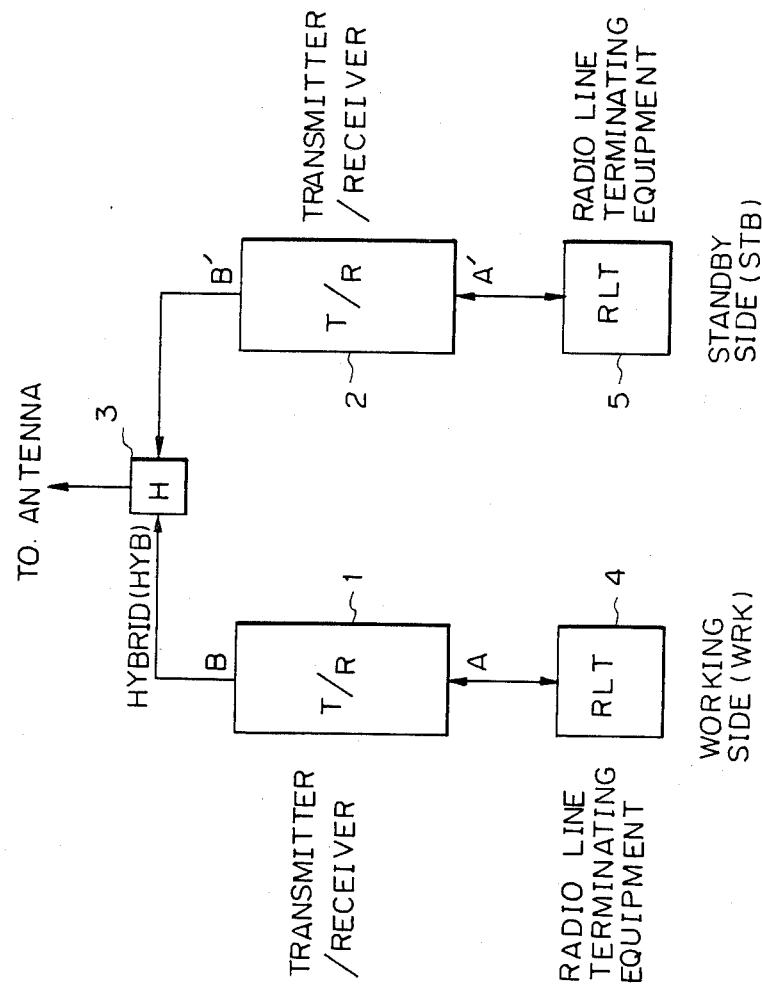
FIG. 6 is a schematic block diagram of a central station as shown in FIG. 5.

FIG. 6 is a schematic block diagram of a central station shown in FIG. 5. In FIG. 6, the central station CNTLS comprises a working transmitter (primary) and receiver WRK, a standby transmitter and receiver STB, and a hybrid HYB. The working transmitter and receiver WRK, as well as the standby transmitter and receiver, comprise radio line terminating equipment RLT. The hybrid HYB connects between the working WRK and the standby STB. The hybrid HYB is connected to an antenna (not shown) for transmitting the signal to all substations.

Figure 7:
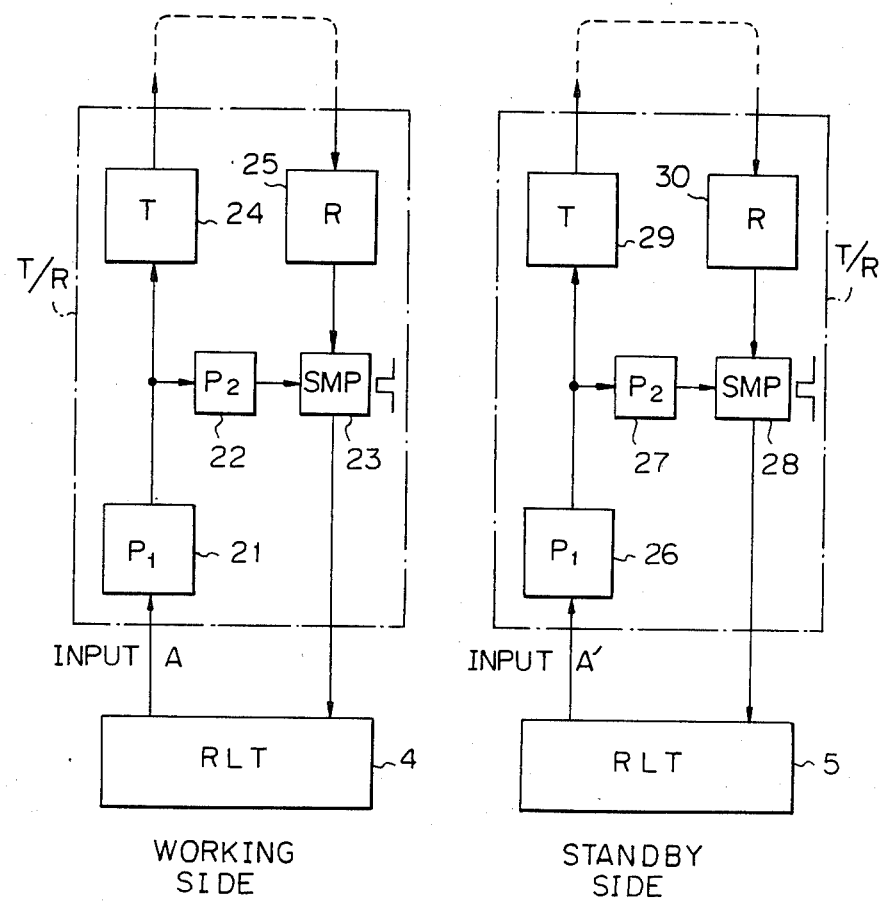
FIG. 7 is a detailed block diagram of a central station as shown in FIG. 6; and, FIG. 8 is a more detailed block diagram of a transmitter and receiver as shown in FIG. 7.

FIG. 7 is a detailed block diagram of a central station shown in FIG. 6. In FIG. 7, the transmitter and receiver unit T/R on the working side, as well as on the standby side, comprises a transmitter T, a receiver R, a first phase shifting device $P_1$, a second phase shifting device $p_2$, and a sampling unit SMP all location at the top of a radio tower.

On the working side, for example, the phase of the regenerated input signal A from the radio line terminating equipment 4 at the base of the tower is adjusted by the first phase shifting device 21 in order to adjust the signal propagation delay time. The phase adjusted signal is changed to a Non-Return-to-Zero (NRZ) signal and transmitted to all substations through the transmitter 24. Simutaneously, this NRZ signal is transmitted to the second phase shifting device 22 in order to adjust the phase of the sampling clock. The clock signal is separated from the NRZ signal and input to the sampling unit 23. The phase of the clock signal is adjusted to a central position of the bit width of the reception signal by the second phase shifting device 22. Meanwhile, the reception signal from each of the substations is received by the receiver 25 and transmitted to the sampling unit 23. In the sampling unit 23, the clock signal is used for correctly sampling the received signal in the central position of the bit width of the received signal.

Adjustments of the signal propagation delay time and the phase of the sampling clock between the working transmitter and receiver and the standby transmitter and receiver are performed as follows.

The phase and frequency of the regenerated input signal A from the RLT 4 is previously set to equal to that of the other regenerated clock input signal A' from the RLT 5. Next, the phase of the received signal at the sampling unit 23 is matched to that of the received signal at the sampling unit 28 by adjusting only the phase $\Delta\alpha$ in the first phase shifting device 21. In addition the phase of the sampling clock signal is adjusted to the central position of the bit width of the reception signal in the sampling unit 23 by adjusting the second phase shifting device 22. The same adjustment is performed in the other second phase shifting device 27.

These adjustments of the signal propagation delay time and the phase of the sampling clock are previously performed before the transmitter and receiver are located at (moved to) the top of the radio tower.

Figure 8:
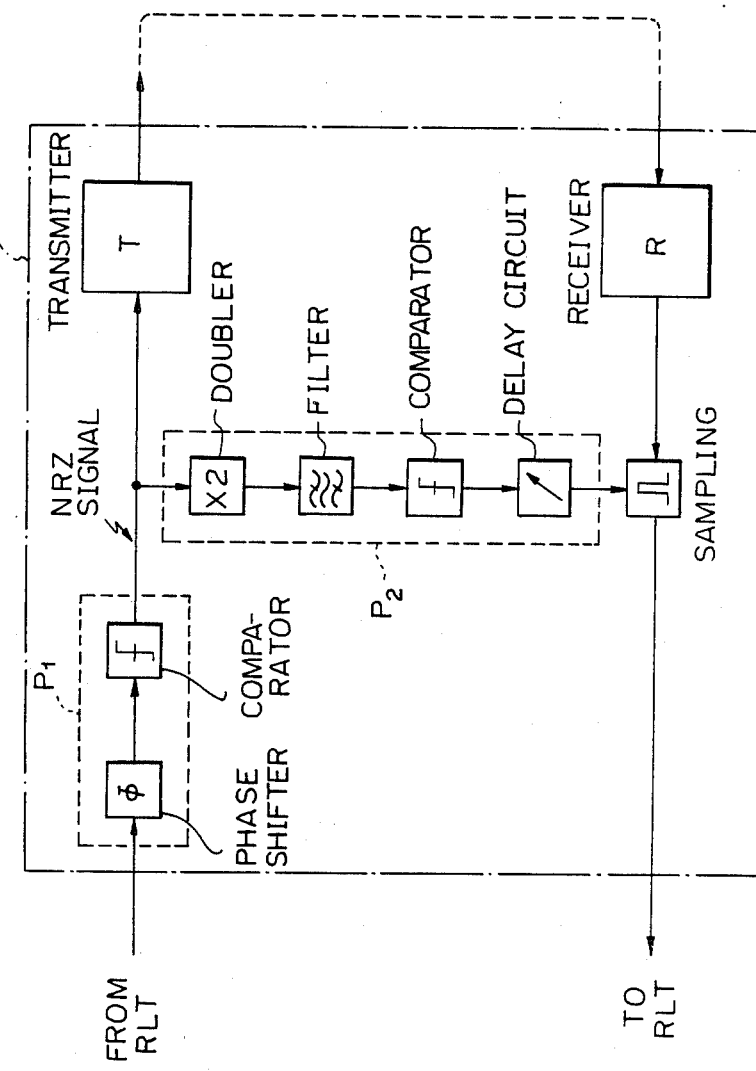

FIG. 8 is a more detailed block diagram of the transmitter and receiver unit shown in FIG. 7. In FIG. 8, the first phase shifting device $P_1$ comprises a phase shifter for adjusting the phase of the transmission signal input from the radio line terminating equipment RLT and a comparator for changing the transmission signal to the NRZ signal. The second phase shifting device $P_2$ comprises a doubler for multiplying the NRZ signal by 2 and for generating the clock signal component, a filter for extracting the clock signal component used as the sampling clock signal, a comparator for changing the sine waveform of the clock signal component to a rectangular waveform, and a delay circuit for adjusting the phase of the sampling clock signal.

Accordingly, the signal propagation delay time and the phase of the sampling clock are previously adjusted as explained above, and no influence caused by the hybrid is felt when changing from the working to the standby transmitter and receiver.

According to the present invention, since the signal propagation delay time of the transmission signal and the phase of the sampling clock signal are previously adjusted between the working transmitter and receiver and the standby transmitter and receiver before the transmitter and receiver is located at the radio tower, when the working transmitter and receiver is changed to the standby transmitter and receiver, no phase lags and leads of the sampling clock signal and difference in the signal propagation delay time of the transmission signal occur in this equipment.

In this embodiment, although in the explanation only one standby transmitter and receiver is used, it is possible to adjust the phases and lags for two or more standby transmitter and receivers by providing the phase shifting means therein.

I claim:

1. A digital radio communication system in the form of a multipoints to point time division multiplex network, comprising:

a central station including one working transmitter and receiver and one standby transmitter and receiver both said working and standby transmitter and receiver include radio line terminating equipment, a first phase shifting means, connected to said radio line terminating equipment and said transmitter, for adjusting a phase of a transmission signal, a second phase shifting means, connected to said first phase shifting means, for adjusting a phase of a sampling clock signal, and a sampling unit connected to said receiver, said second phase shifter and said radio line terminating equipment to receive a reception signal, having a width from said receiver, whereby a signal propagation delay time of said working transmitter and receiver is adjusted by said first phase shifting means to be equal to that of said standby transmitter and receiver by adjusting the phase of the transmission signal and a phase of the sampling clock signal is adjusted between said second phase shifting means of both receivers to be at the central position of the bit width of the reception signal; and a plurality of substations, each operatively connected to the corresponding central station using a time-divided digital radio signal, and each having at least clock phase shifting means for adjusting a phase of a transmission signal transmitted by the corresponding substation.

2. A digital radio communication system as claimed in claim 1, wherein said first phase shifting means comprises a phase shifter for adjusting the phase of the transmission signal and a comparator for changing the transmission signal to a Non-Return-to-Zero (NRZ) signal.

3. A digital radio communication system as claimed in claim 1 or 2, wherein said second phase shifting means comprises:

a doubler, connected to said first phase shifting means, for multiplying said NRZ signal by 2 and generating a clock signal component;

a filter connected to said doubler for extracting said clock signal component for use as said sampling clock signal;

a comparator, connected to said filter, for changing a sine waveform of said sampling clock signal to a rectangular waveform; and a delay circuit, operatively connected to said comparator and said working receiver, for adjusting a phase of said clock signal component.

* * * * *